United States Patent
First et al.

(10) Patent No.: US 7,290,172 B2
(45) Date of Patent: Oct. 30, 2007

(54) COMPUTER SYSTEM MAINTENANCE AND DIAGNOSTICS TECHNIQUES

(75) Inventors: Carl L. First, Folsom, CA (US);
Morris E. Jones, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 681 days.

(21) Appl. No.: 10/738,277

(22) Filed: Dec. 16, 2003

(65) Prior Publication Data

US 2005/0188260 A1    Aug. 25, 2005

(51) Int. Cl.
*G06F 11/00*    (2006.01)
(52) U.S. Cl. .......................................... 714/22; 714/25
(58) Field of Classification Search ................. 714/25, 714/22, 46, 13, 47
See application file for complete search history.

(56) References Cited

U.S. PATENT DOCUMENTS

| | | | |
|---|---|---|---|
| 6,163,849 A * | 12/2000 | Nouri et al. ................. | 713/324 |
| 6,243,831 B1 | 6/2001 | Mustafa et al. ............... | 714/24 |
| 6,442,605 B1 * | 8/2002 | Rodriguez .................. | 709/223 |
| 6,763,458 B1 * | 7/2004 | Watanabe et al. ........... | 713/100 |
| 2005/0138470 A1 * | 6/2005 | Cromer et al. ................ | 714/22 |

OTHER PUBLICATIONS

Distributed Management Task Force, Inc. (DMTF), "Alert Standard Format (ASF) Specification: Version 2.0", Document No. DSP0136, Apr. 23, 2003, Kevin Cline, Editor, located at http://www.dmtf.org/standards/documents/ASF/DSP0136.pdf.

* cited by examiner

*Primary Examiner*—Dieu-Minh Le
(74) *Attorney, Agent, or Firm*—Caven & Aghevli, LLC

(57) ABSTRACT

Methods and apparatus relating to computer system maintenance and/or diagnostics are described. In an embodiment, maintenance and diagnostics operations may be performed on a computer system during power-down modes, e.g., without disturbing the pre-power-down state of the computer system. In another embodiment, a request may be provided to perform a maintenance operation on a computer system in response to a power-down state of the computer system. Also, some contents of a state of the computer system may be stored in a memory in response to the at least some contents not previously having been backed-up in accordance with one embodiment. Other embodiments are also disclosed.

27 Claims, 2 Drawing Sheets

COMPUTER SYSTEM MAINTENANCE AND DIAGNOSTICS TECHNIQUES

FIELD

The subject matter disclosed herein generally relates to techniques for computer system maintenance and diagnostics.

DESCRIPTION OF RELATED ART

Currently, personal computer (PC) diagnostics cannot be effectively executed while the operating system is active. Accordingly, diagnostics may be executed only when the PC or the software operated by the PC malfunctions. It is desirable to perform diagnostics of a PC prior to PC malfunction.

BRIEF DESCRIPTION OF THE DRAWINGS

Note that use of the same reference numbers in different figures indicates the same or like elements.

DETAILED DESCRIPTION

In accordance with an embodiment of the present invention, maintenance and diagnostics operations can be performed on a computer system in power-down mode. In one embodiment, the computer system can schedule and request maintenance and diagnostics operations. In one embodiment, maintenance and diagnostics operations do not disturb the states of the operating system and the user activity of the computer system. In one embodiment, the computer system communicates the results of maintenance and diagnostics operations to a central maintenance and diagnostics management device. Accordingly, in the event a worker needs to be physically dispatched to a location to repair a computer system, the worker may know specifically what needs to be fixed and what tools and remedies to bring.

Figure 1:
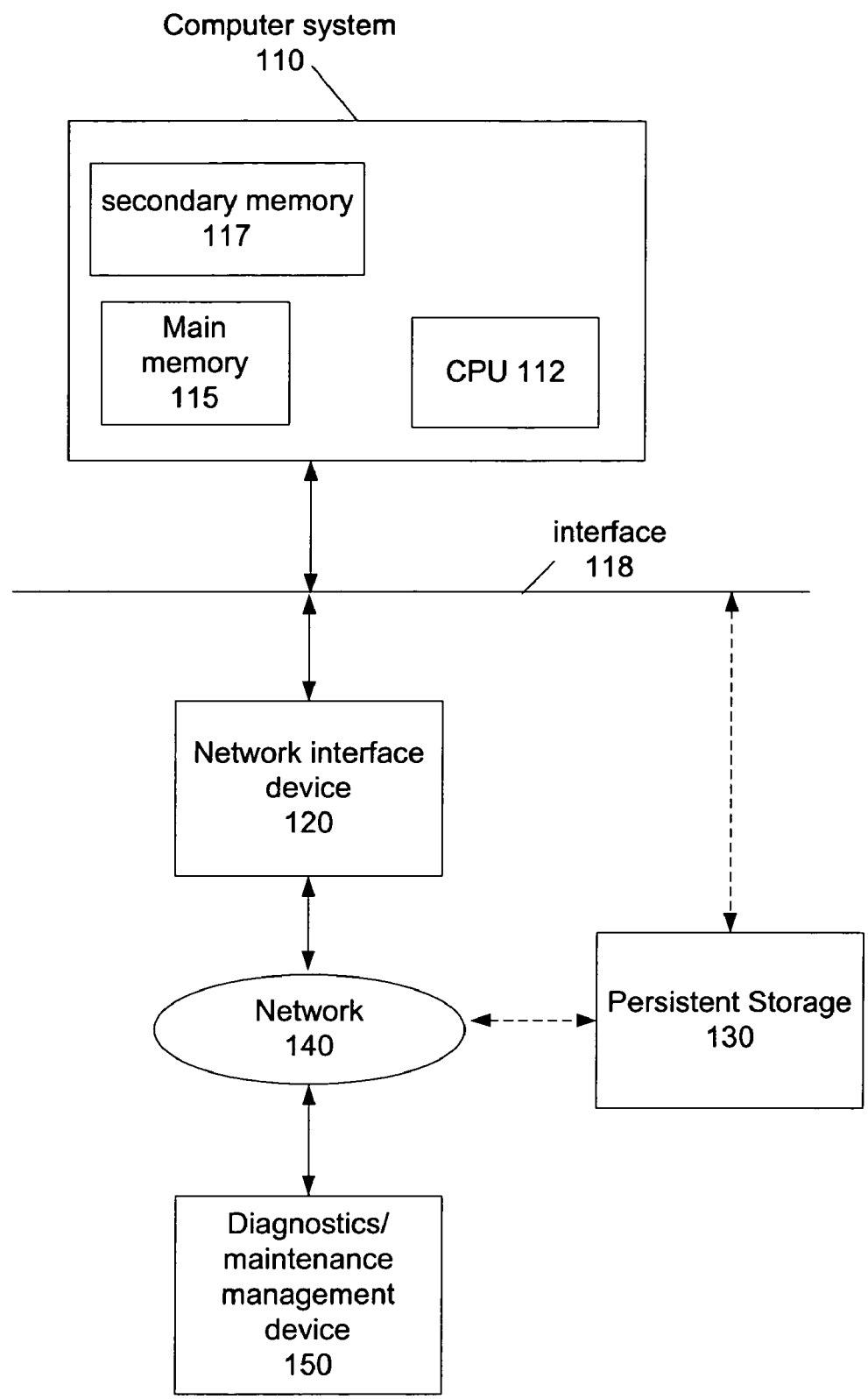
FIG. 1 depicts a suitable system that can use embodiments of the present invention.

FIG. 1 depicts a suitable system that can use embodiments of the present invention. The system may include computer system 110, interface 118, network interface device 120, persistent storage device 130, network 140, and diagnostics/maintenance management device 150.

Computer system 110 may include central processing unit (CPU) 112, main memory 115, and secondary memory 117. Some implementations of computer system 110 may include interface 118. Memory 115 may store a state of the operating system as well as applications executed by computer system 110 prior to entering power-down mode. For example, in so-called "hibernate" power-down mode, network interface device 120 may receive power to operate but computer system 110 may not receive power. Prior to memory 115 receiving reduced power in hibernate mode, contents of memory 115 (such as operating system (OS) and application states) may be stored in another memory device. In so-called "suspend" power-down mode, CPU 112 of computer system 110 may not receive power but memory devices within computer system 110 may receive enough power to continue to store information. Memory 115 may be implemented as a storage device such as a flash memory (e.g., DRAM) or magnetic storage device.

Interface 118 may provide intercommunication between computer system 110 and other devices such as network interface device 120 and/or persistent storage 130, as the case may be. In some implementations, interface 118 may be incorporated into computer system 110. Interface 118 may be implemented as a serial and/or bus interface. For example interface 118 may comply with Peripheral Component Interconnect (PCI), Ten Gigabit Attachment Unit Interface (XAUI) (described in IEEE 802.3, IEEE 802.3ae, and related standards), Serial Peripheral Interface (SPI), $I^{12}C$, universal serial bus (USB) (as well as variations and advancements in USB), IEEE 1394, Gigabit Media Independent Interface (GMII) (described in IEEE 802.3, IEEE 802.3ae, and related standards), and/or ten bit interface (TBI).

Network interface device 120 may receive messages through network 140 even though computer system 110 is in power-down mode. For example, the received message may be for the computer system 110 to perform a maintenance/diagnostics operation. Network interface device 120 may transmit messages through network 140 to for example, at least persistent storage device 130 and/or diagnostics/maintenance device 150. For example, network 140 may be an electrical, optical, or wireless network compatible with Ethernet (as described for example in IEEE 802.3 and related standards), IEEE 1394, and 802.11 (and related standards). Network interface device 120 may be implemented as a Wake-on-LAN compatible network interface card or device compatible for example with the Microsoft network driver interface specification (NDIS) version 6.0 and later.

Persistent storage device 130 may store contents of main memory 115 when computer system 110 is in a power-down mode. The operation of persistent storage device 130 to store information may be independent of the power state of computer system 110. Persistent storage device 130 may communicate with computer system 110 using network 140 or using interface 118. Persistent storage device 130 may be implemented as a storage device such as a flash memory or magnetic storage device.

Diagnostics/maintenance management device 150 may communicate with computer system 110 using network interface device 120. Diagnostics/maintenance management device 150 may instruct computer system 110 when to execute a maintenance/diagnostics routine and the specific maintenance/diagnostics routine to execute. Diagnostics/management device 150 may also monitor results of maintenance/diagnostics routines. For example, computer system 110 may provide results of maintenance/diagnostics routines to diagnostics/management device 150. For example, diagnostics/maintenance management device 150 may communicate with network interface device 120 using the TCP/IP protocol as well as Simple Network Management Protocol (SNMP), common information model (CIM) (distributed, for example, by Distributed Management Task Force, Inc.), and/or XML. Diagnostics/management device 150 may be implemented as a server computer. In some embodiments, diagnostics/maintenance management device 150 manages diagnostics and maintenance of multiple computer systems.

Figure 2:
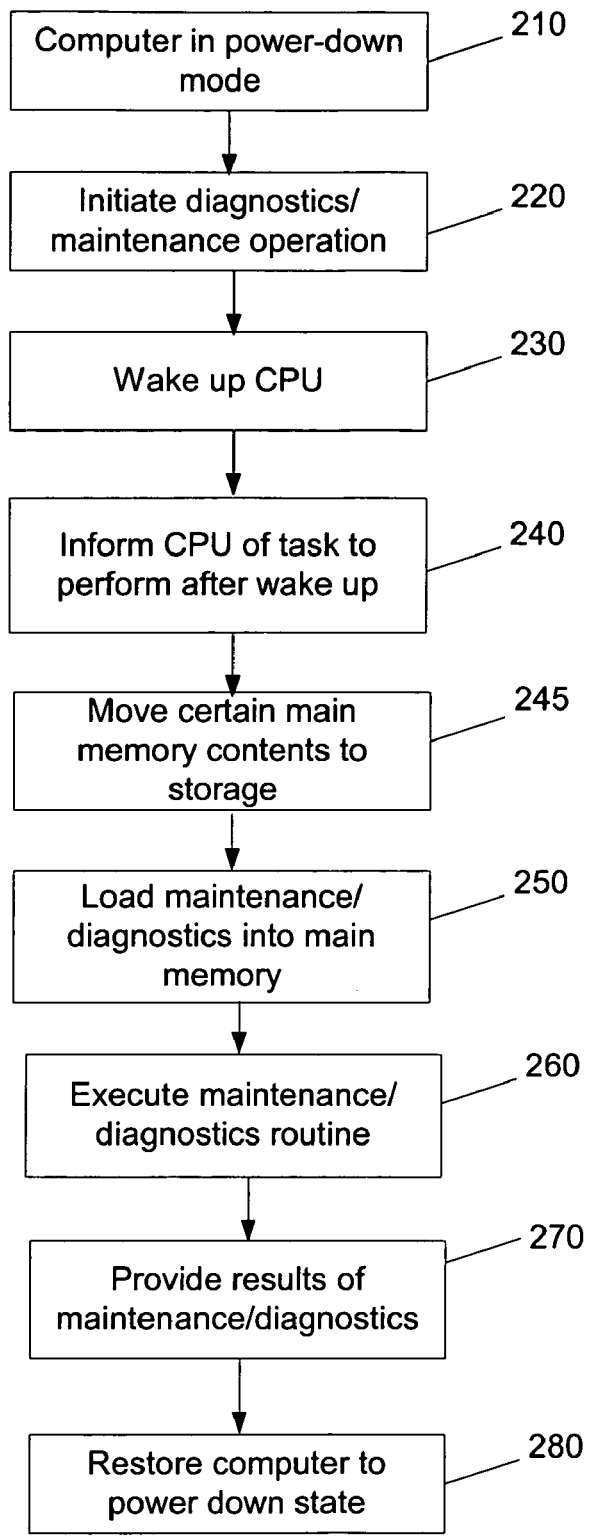
FIG. 2 depicts a suitable process in accordance with an embodiment of the present invention to provide maintenance and diagnostics to a target computer in power-down mode.

FIG. 2 depicts a suitable process in accordance with an embodiment of the present invention to provide maintenance and diagnostics for a target computer in power-down mode. The process of FIG. 2 may be implemented using any or a combination of hardwired logic, software stored by a memory device and executed by a microprocessor, firmware, an application specific integrated circuit (ASIC), and/or a field programmable gate array (FPGA).

In action 210, the process determines that a target computer is in power-down mode. In one implementation, a network interface device may detect the power state of a target computer and communicate such power state of such target computer to the diagnostics/maintenance management device. For example, the network interface device may detect the state of the target computer by reading a register that indicates the CPU of the target computer is in power-down mode. For example, PCI compatible interfaces provide at least a register that indicates whether the CPU is in power-down state. The network interface device may communicate to the diagnostics/maintenance management device which CPU is in power-down mode. For example, Alert Standard Format (ASF) Specification v2.0 (2003) describes manners by which to communicate that a CPU is in power-down state.

In action 220, a diagnostics/maintenance operation may initiate for a target computer. For example, a diagnostics/maintenance management device may issue a command to the network interface device for the specified target computer to execute one or more specified maintenance/diagnostics routine(s). Action 220 may include issuing commands to network interface devices of multiple target computers to each initiate a diagnostics/maintenance operation.

In action 230, CPU(s) of target computer(s) identified in action 220 may receive more power than in power-down mode. For example, action 230 may include the network interface device initiating restoration of full power to the CPU. For example on a PCI compatible interface, the network interface device may control a register to command the computer system to restore full power to the CPU, although other protocols and techniques may be used. The network interface device may report to the diagnostics/maintenance management device whether the power restore operation was successful or not successful. For example, if within a prescribed time period the computer system does not report back to the network interface device that the power mode of the computer system is restored to full power, then the network interface device may report a failure of the power-up to the maintenance/diagnostics management device.

In action 240, the network interface device indicates to the CPU what task(s) to perform after waking up. In one implementation of action 240, a BIOS executed by the CPU at wake-up instructs the network interface device to query the maintenance/diagnostics management device which routine to execute at wake-up. In response to the query, maintenance/diagnostics management device may identify a storage device and location in such storage device of the routine. In one implementation of action 240, at wake-up, the network interface device instructs the BIOS executed by the CPU to execute a maintenance/diagnostic routine located at a specified memory location in an identified storage device. For example, the command issued by the maintenance/diagnostics management device to the network interface device in action 220 may describe the memory location of a maintenance/diagnostics routine in persistent storage.

In action 245, certain contents of the main memory of the target computer may be moved into storage that is not affected by the power-down state of the target computer. For example, in suspend mode, the target computer may move to a persistent storage device an operating system state of the target computer as well as states of applications executed prior to the target computer entering power-down mode. For example, the process may skip action 245 if the operating system state of the target computer as well as states of applications executed prior to the target computer entering power-down mode were previously copied to persistent storage.

In action 250, the target computer loads the specified maintenance/diagnostics routines into main memory. In one implementation, the network interface device requests identified routine(s) from persistent storage and persistent storage provides identified maintenance/diagnostics routines to be executed by the target computer for storage into main memory. In one implementation, after the target computer leaves hibernate mode for an increased power mode and after the operating system state as well as states of applications in main memory are copied to persistent storage, the target computer may load maintenance/diagnostics routines into main memory.

In action 260, the CPU of the target computer executes the identified maintenance/diagnostics routine. For example, the following is a non-exhaustive list of tests the maintenance/diagnostics routine may perform: memory operation test, CPU operation test, functionality of peripherals to the target computer, interface integrity, whether varying voltages affect operation of the computer system, whether varying clock speeds affect operation of the computer system, graphics system check, and keyboard and mouse interfaces check.

In action 270, each target computer provides results from the executed maintenance/diagnostics routine. In one embodiment, the maintenance/diagnostic routine may provide results to the network interface device and the network interface device may store the results into main memory and/or persistent storage and may transmit results to the maintenance/diagnostics device. In one embodiment, results include, but are not limited to, the make/serial number of defective device(s), predictive information that indicates what is likely to fail in the target computer, and monitor status (e.g., results from tests based on voltage and temperature variations). In one embodiment, if the network interface device does not receive maintenance/diagnostics results within a certain time period, the network interface device informs the maintenance/diagnostics device that the target computer is defective and may store such result into main memory and/or persistent storage.

In action 280, each target computer returns back to its power-down state. In one embodiment, action 280 may include the persistent storage providing the OS state and applications states stored in action 245 into main memory of the target computer.

Modifications

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   selectively providing a request from a management device to perform a maintenance operation on a computer system in response to a power-down state of the computer system;
   selectively reproducing into a first storage at least some contents of a state of the computer system in response to the at least some contents not previously having been backed-up and in response to the computer system entering the power-down state, wherein operation of the first storage is independent of the power-down state of the computer system; and
   providing the results of the maintenance operation,
   wherein each of the management device and the first storage are coupled to the computer system via a network interface device.

2. The method of claim 1, further comprising providing at least one routine associated with the maintenance operation into memory of the computer system after the reproducing.

3. The method of claim 1, wherein the at least some contents includes an operating system state of the computer system as well as states of applications executed prior to the computer system entering power-down state.

4. The method of claim 1, wherein the providing the results of the maintenance operation comprises storing results of the maintenance operation.

5. The method of claim 1, wherein the providing the results of the maintenance operation comprises communicating the results of the maintenance operation to a maintenance management device.

6. The method of claim 1, wherein the power-down mode comprises hibernate mode.

7. The method of claim 1, wherein the power-down mode comprises suspend mode.

8. An apparatus comprising:
a storage medium storing therein instructions that cause a machine to execute the following operations:
selectively provide a request from a management device to perform a maintenance operation on a computer system in response to a power-down state of the computer system;
selectively reproduce into a first storage at least some contents of a state of the computer system in response to the at least some contents not previously having been backed-up and in response to the computer system entering the power-down state, wherein operation of the first storage is independent of the power-down state of the computer system; and
provide the results of the maintenance operation,
wherein each of the management device and the first storage are coupled to the computer system via a network interface device.

9. The apparatus of claim 8, further comprising instructions that cause a machine to execute the following operations:
provide at least one routine associated with the maintenance operation into memory of the computer system after the instruction to reproduce completes.

10. The apparatus of claim 8, wherein the at least some contents includes an operating system state of the computer system as well as states of applications executed prior to the computer system entering power-down state.

11. The apparatus of claim 8, wherein the instruction to provide the results of the maintenance operation comprises at least one instruction to store results of the maintenance operation.

12. The apparatus of claim 8, wherein the instruction to provide the results of the maintenance operation comprises at least one instruction to communicate the results of the maintenance operation to a maintenance management device.

13. An apparatus comprising:
a first logic circuitry to selectively provide a request to perform a maintenance operation on a computer system in response to a power-down state of the computer system;
a second logic circuitry to selectively reproduce into a first storage at least some contents of a state of the computer system in response to the at least some contents not previously having been backed-up and in response to the computer system entering the power-down state, wherein operation of the first storage is independent of the power-down state of the computer system; and
a third logic circuitry to provide the results of the maintenance operation,
wherein each of the first logic circuitry and the second logic circuitry are coupled to the computer system via a network interface device.

14. The apparatus of claim 13, further comprising logic circuitry to provide at least one routine associated with the maintenance operation into memory of the computer system after the reproducing.

15. The apparatus of claim 13, wherein the at least some contents includes an operating system state of the computer system as well as states of applications executed prior to the computer system entering power-down state.

16. The apparatus of claim 13, further comprising logic circuitry to store results of the maintenance operation.

17. The apparatus of claim 13, further comprising logic circuitry to communicate the results of the maintenance operation to a maintenance management device.

18. The apparatus of claim 13, further comprising a network interface device to provide intercommunication between a maintenance management device and the computer system.

19. The apparatus of claim 18, wherein the network interface device is compatible with Wake-on-LAN.

20. The apparatus of claim 18, further comprising an interface device to provide intercommunication between the network interface device and the computer system.

21. The apparatus of claim 20, wherein the interface device is compatible with Peripheral Component Interconnect.

22. The apparatus of claim 20, wherein the interface device is compatible with Universal Serial Bus.

23. A method comprising:
selectively providing requests from a management device to perform maintenance operations on at least two computer systems in response to power-down states of each computer system;
selectively reproducing into a first storage at least some contents of states of each computer system in response to the at least some contents not previously having been backed-up and in response to the computer systems entering the power-down state, wherein operation of the first storage is independent of the power-down state of each computer system; and
providing the results of the maintenance operation,
wherein each of the management device and the first storage are coupled to the computer systems via network interface devices.

24. The method of claim 23, further comprising providing at least one routine associated with the maintenance operation into memory of each computer system after the reproducing.

25. The method of claim 23, wherein the at least some contents includes an operating system state of each computer system as well as states of applications executed prior to each computer system entering power-down state.

26. The method of claim 23, wherein the providing the results of the maintenance operation comprises storing results of the maintenance operation.

27. The method of claim 23, wherein the providing the results of the maintenance operation comprises communicating the results of the maintenance operation to a maintenance management device.

* * * * *